United States Patent
Holmes et al.

(10) Patent No.: US 11,315,211 B2
(45) Date of Patent: Apr. 26, 2022

(54) METHODS AND APPARATUS FOR EFFICIENT MOTION ESTIMATION

(71) Applicant: QUALCOMM Incorporated, San Diego, CA (US)

(72) Inventors: Samuel Benjamin Holmes, Sterling, MA (US); Jonathan Wicks, Louisville, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/987,983

(22) Filed: Aug. 7, 2020

(65) Prior Publication Data
US 2021/0056661 A1  Feb. 25, 2021

Related U.S. Application Data

(60) Provisional application No. 62/888,974, filed on Aug. 19, 2019.

(51) Int. Cl.
*G06T 1/20* (2006.01)
*G06T 7/20* (2017.01)
*A63F 13/52* (2014.01)

(52) U.S. Cl.
CPC ............ *G06T 1/20* (2013.01); *G06T 7/20* (2013.01); *A63F 13/52* (2014.09); *A63F 2300/538* (2013.01)

(58) Field of Classification Search
None
See application file for complete search history.

(56) References Cited

U.S. PATENT DOCUMENTS

| | | | | |
|---|---|---|---|---|
| 6,671,321 B1* | 12/2003 | Ohtani | ............... | H04N 5/145 348/416.1 |
| 2003/0053544 A1* | 3/2003 | Yasunari | ............. | H04N 19/137 375/240.16 |
| 2006/0018563 A1* | 1/2006 | Ruggiero | ................ | G06T 1/20 382/300 |
| 2013/0198794 A1* | 8/2013 | Dharmapurikar | ............ | H04N 21/23655 725/118 |

(Continued)

OTHER PUBLICATIONS

Guenter, et al., "Motion Compensated Noise Reduction Method and System or Computer Generated Images", Feb. 18, 1997 (Feb. 18, 1997), XP055497730, Retrieved from the Internet: URL: https://pdfs.semanticscholar.org/0c69/caa9e96d278754b94d8fcbbd0f9211e03c56.pdf. 8 Pages, the whole document.

(Continued)

*Primary Examiner* — Patrick F Valdez
(74) *Attorney, Agent, or Firm* — Campbell C. Chiang; Arent Fox LLP

(57) ABSTRACT

The present disclosure relates to methods and apparatus for graphics processing. The apparatus can determine a motion estimation priority for one or more regions in a frame. In some aspects, each of the one or more regions can include a group of pixels. Additionally, the apparatus can adjust a quality of a motion estimation procedure for each group of pixels based on the motion estimation priority of the region including the group of pixels. The apparatus can also perform the motion estimation procedure for each of the at least one group of pixels to generate a motion vector for the at least one group of pixels based on the adjusted quality of the motion estimation procedure.

27 Claims, 6 Drawing Sheets

(56) References Cited

U.S. PATENT DOCUMENTS

| | | | |
|---|---|---|---|
| 2018/0165792 A1* | 6/2018 | Tavakoli | G06F 3/013 |
| 2018/0260961 A1 | 9/2018 | Narita | |
| 2018/0286105 A1* | 10/2018 | Surti | H04N 13/239 |
| 2019/0045193 A1* | 2/2019 | Socek | H04N 19/543 |
| 2020/0288164 A1* | 9/2020 | Lin | H04N 21/44218 |

OTHER PUBLICATIONS

Guenter B., et al., "Foveated 3D Graphics", ACM Transactions on Graphics, vol. 31, No. 6, Nov. 2012 (Nov. 2012), 10 Pages, XP055199808, ISSN: 0730-0301, DOI: 10.1145/2366145.2366183, abstract; figures 1,3, p. 164:1, col. 2, section 4, abstract; figures 3, 6, 7 p. 2, paragraph 1 p. 6, right-hand column, paragraph 2—p. 7, left-hand column, paragraph 1 Antialiasing, p. 4, right-hand column, paragraph 4, Introduction; p. 1, right-hand column, paragraph 2, Foveated Rendering System; p. 3, right-hand column. paragraph 4—p. 4, left-hand column, paragraph 1, Eccentricity Layer Parameter Optimization, p. 5-p. 6.

International Search Report and Written Opinion—PCT/US2020/045671—ISA/EPO—dated Oct. 30, 2020.

\* cited by examiner

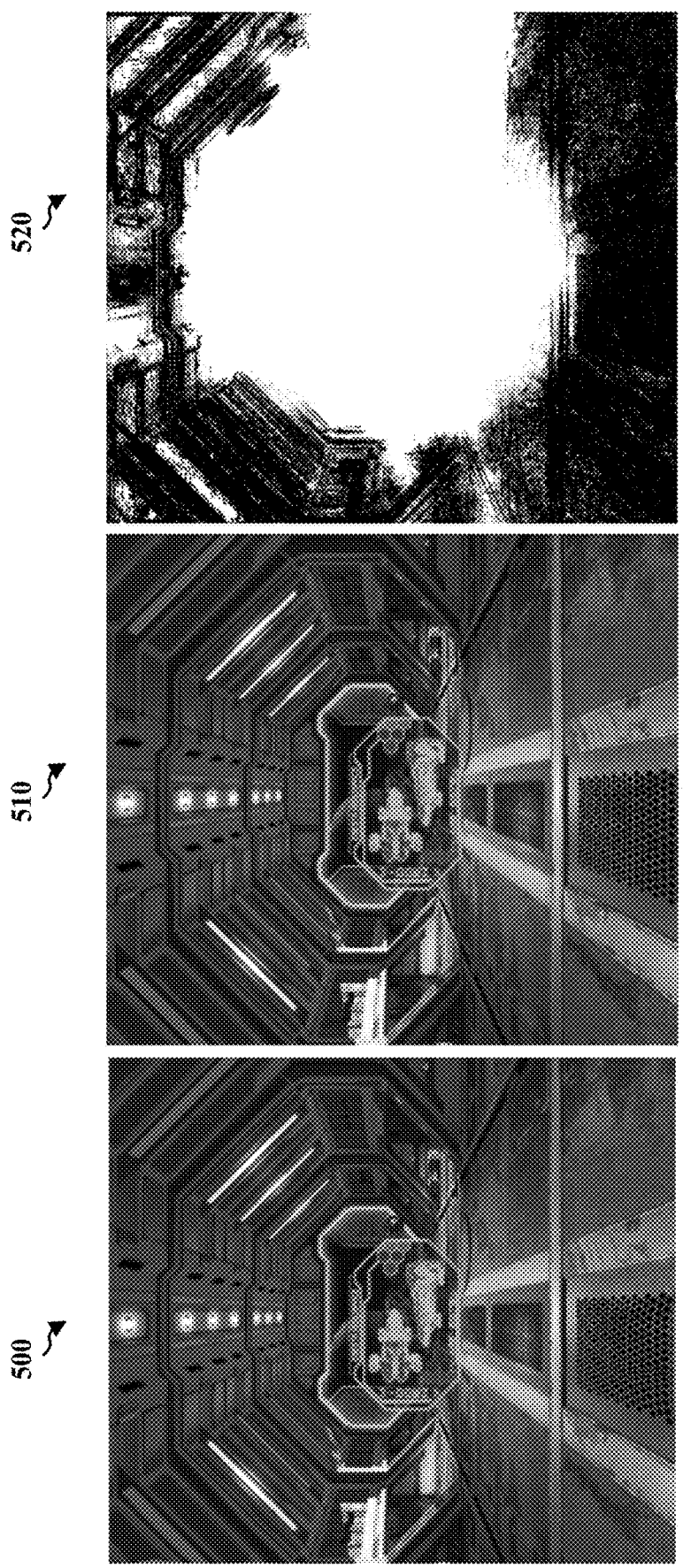

METHODS AND APPARATUS FOR EFFICIENT MOTION ESTIMATION

This application claims priority to U.S. Provisional Application No. 62/888,974 titled "METHODS AND APPARATUS FOR EFFICIENT MOTION ESTIMATION," filed Aug. 19, 2019, which is assigned to the assignee hereof, and incorporated herein by reference in their entirety.

TECHNICAL FIELD

The present disclosure relates generally to processing systems and, more particularly, to one or more techniques for graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. This summary presents some concepts of one or more aspects in a simplified form as a prelude to the more detailed description that is presented later.

In an aspect of the disclosure, a method, a computer-readable medium, and an apparatus are provided. The apparatus may be a graphics processing unit (GPU). In some aspects, the apparatus can be configured to determine a motion estimation priority for one or more regions in a frame, wherein each of the one or more regions includes at least one group of pixels. The apparatus can be configured to adjust a quality of a motion estimation procedure for each group of pixels based on the motion estimation priority of the region including the group of pixels. The apparatus can be configured to perform the motion estimation procedure for each of the at least one group of pixels to generate a motion vector for the at least one group of pixels based on the adjusted quality of the motion estimation procedure.

In some implementations, the one or more regions include a central region and a peripheral region.

In some implementations, the one or more regions include at least one intermediate region between the central region and the peripheral region.

In some implementations, the apparatus is configured to track a position of an eye. The one or more regions in the frame are defined with respect to the position of the eye.

In some implementations, the apparatus is configured to determine to set a constant value for the at least one group of pixels in a region having a lowest motion estimation priority.

In some implementations, the apparatus is configured to set a size of the at least one group of pixels based on the motion estimation priority.

In some implementations, the apparatus is configured to adjust a size of a search window to be covered during the motion estimation procedure based on the motion estimation priority.

In some implementations, the apparatus is configured to determine inclusion or omission of a multi-pass algorithm with motion vector refinement in the motion estimation procedure based on the motion estimation priority.

In some implementations, the apparatus is configured to determine a block size for a sum of absolute differences (SAD) operation or a sum of squared differences (SSD) operation based on the motion estimation priority.

In some implementations, the apparatus is configured to adjust an amount of filtering performed during motion search filtering or performed on final motion vectors based on the motion estimation priority.

In some implementations, the apparatus is configured to extrapolate a new frame from the frame based on the motion vector for each group of pixels.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 5A is a photograph of an example of an image generated based on motion vectors with uniform quality of motion estimation.

FIG. 5B is a photograph of an example of an image generated based on motion vectors with adjusted quality of motion estimation for different regions in accordance with one or more techniques of this disclosure.

FIG. 5C illustrates an example heat map showing difference between FIG. 5A and

FIG. 5B in accordance with one or more techniques of this disclosure.

DETAILED DESCRIPTION

Figure 1:
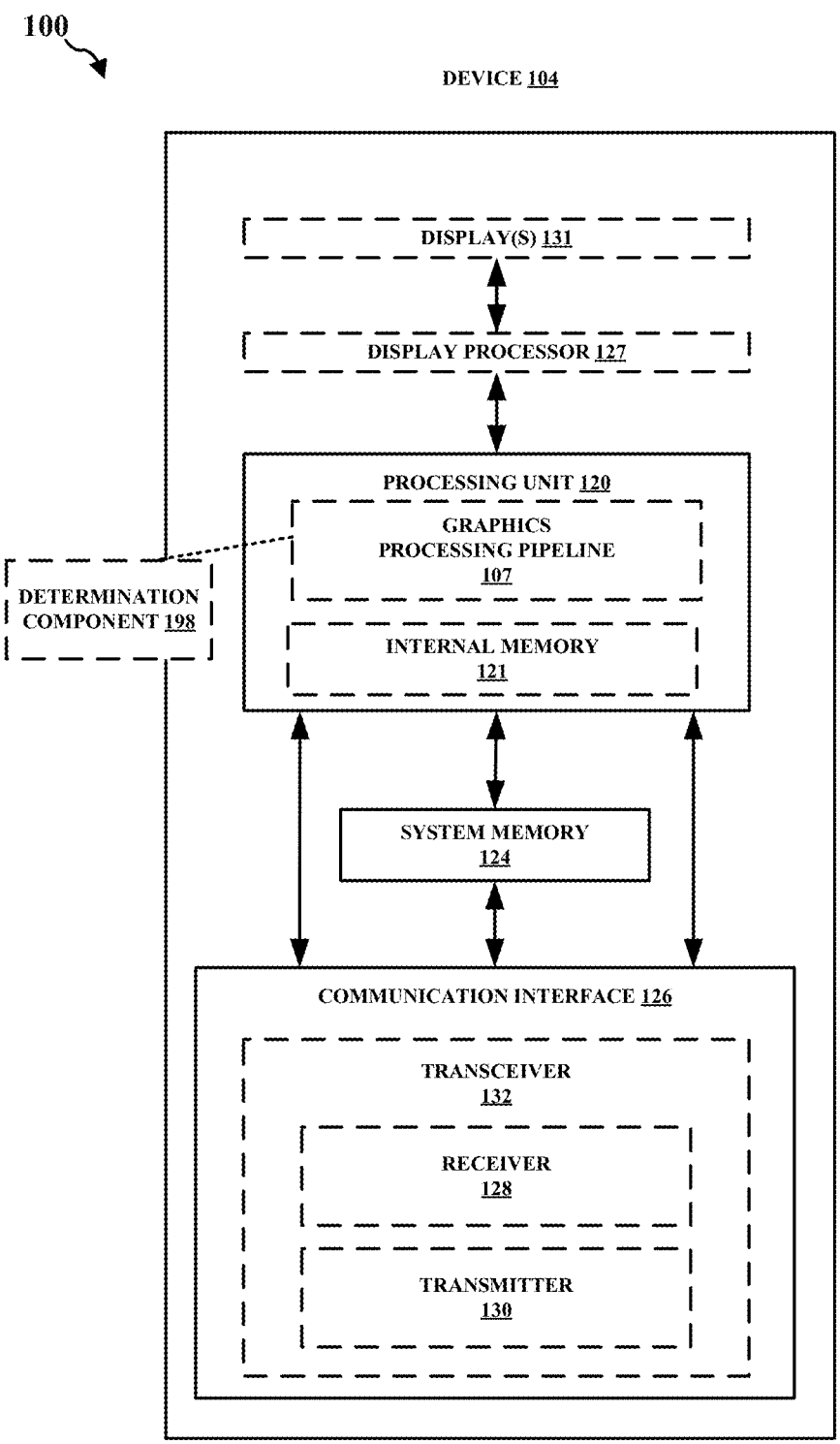
FIG. 1 is a block diagram that illustrates an example content generation system in accordance with one or more techniques of this disclosure.

Performing high quality motion estimation can be a significant cost when deploying frame extrapolation solutions in virtual reality (VR), augmented reality (AR), extended reality (XR), or gaming applications. In these applications, regions farther from the focal point of an image may be deemed less important than image regions closer to the focal point of the image. In some aspects, motion estimation quality can be scaled based on the distance from a focal point of an image. In order to decrease the potential cost of motion estimation, aspects of the present disclosure can perform motion estimation based on the distance from a focal point of an image. For instance, aspects of the present disclosure can determine a motion estimation priority for one or more regions in a frame, where each of the one or more regions can include a corresponding motion vector. Aspects of the present disclosure can also adjust a quality of each corresponding motion vector based on the motion estimation priority. Aspects of the present disclosure can also perform a motion estimation for each of the one or more regions based on the quality of the corresponding motion vector.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

As used herein, instances of the term "content" may refer to graphical content or display content. In some examples, as used herein, the term "graphical content" may refer to a content generated by a processing unit configured to perform graphics processing. For example, the term "graphical content" may refer to content generated by one or more processes of a graphics processing pipeline. In some examples, as used herein, the term "graphical content" may refer to content generated by a graphics processing unit. In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120, such as system memory 124, may be accessible to the processing unit 120. For example, the processing unit 120 may be configured to read from and/or write to external memory, such as the system memory 124. The processing unit 120 may be communicatively coupled to the system memory 124 over a bus. In some examples, the processing unit 120 may be communicatively coupled to each other over the bus or a different connection.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to determine a motion estimation priority for one or more regions in a frame. In some aspects, each of the one or more regions can include at least one group of pixels. Additionally, the determination component 198 can be configured to adjust a quality of a motion estimation procedure for each group of pixels based on the motion estimation priority of the region including the group of pixels. The determination component 198 can also be configured to perform the motion estimation procedure for each of the at least one group of pixels to generate a motion vector for the at least one group of pixels based on the adjusted quality of the motion estimation procedure. In some implementations, the determination component 198 can also be configured to extrapolate a new frame from the frame based on the motion vector for each group of pixels.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein.

Figure 2:
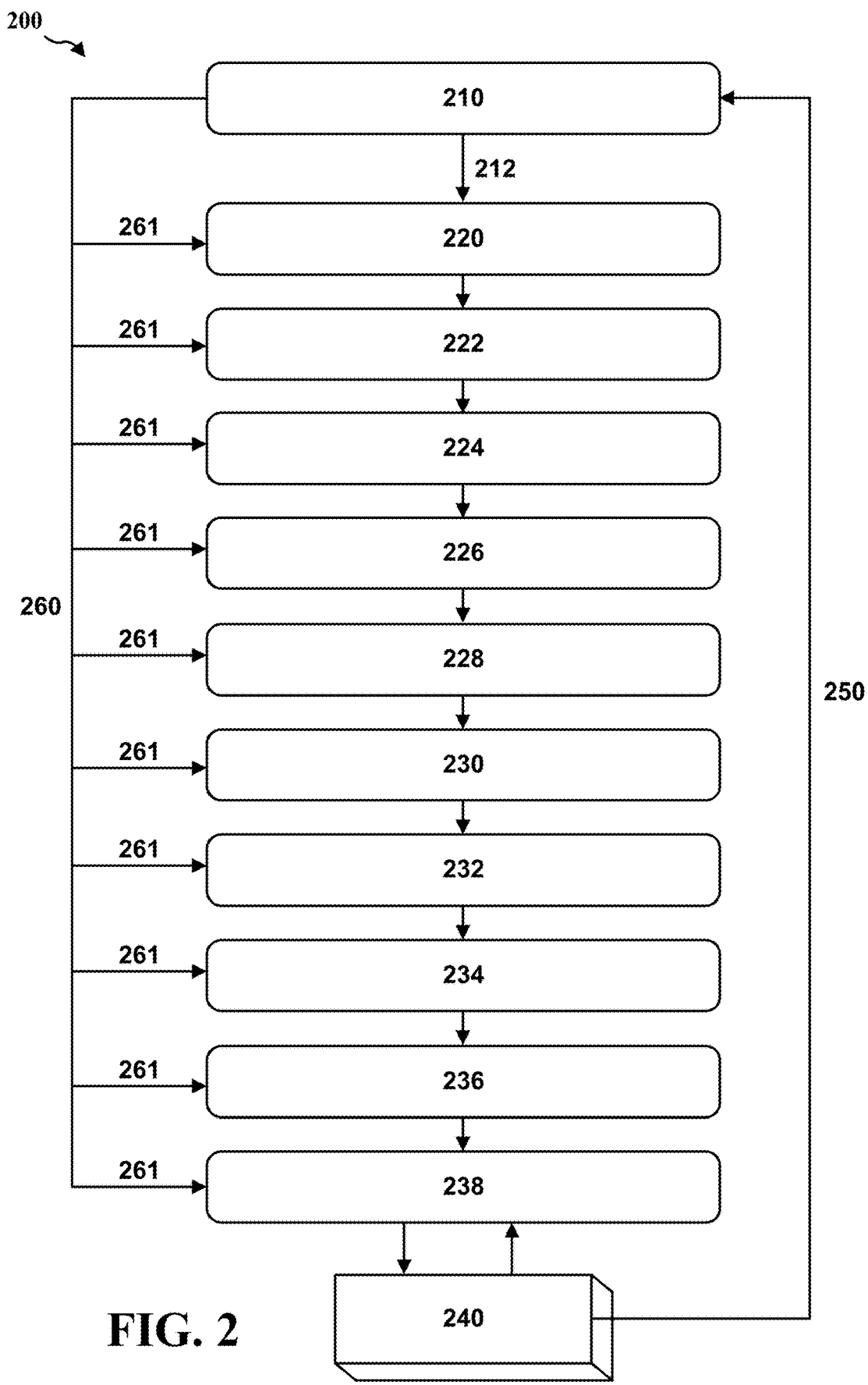
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, vertex fetcher (VFD) 220, vertex shader (VS) 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

GPUs can process multiple types of data in a GPU pipeline. For instance, in some aspects, a GPU can process two types of data or data packets, e.g., context register packets and draw call data. As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured as follows: context register of context N, draw call(s) of context N, context register of context N+1, and draw call(s) of context N+1.

Motion estimation is the process of analyzing multiple two dimensional (2D) images and producing motion vectors which describe the movement of regions from one image to the other. For example, motion estimation is a method of estimating the motion experienced during consecutive frames, e.g., during virtual reality (VR), augmented reality (AR), extended reality (XR), and/or gaming applications. Motion estimation can produce motion vectors that can describe how objects or groups of pixels move within certain sections of an image.

Motion vectors can have a variety of uses including video compression, post-processing effects, such as motion blur, and frame extrapolation or interpolation. In order to lighten the rendering workload on a GPU, VR or AR systems can utilize motion estimation in order to extrapolate frames from previously rendered content. By doing so, this may allow the GPU to render frames at a reduced rate, where the extrapolated frames are displayed to the user in the place of rendered content. Motion estimation can be useful because in VR or AR systems there is a strong drive to reduce the rendering workload, e.g., at the GPU.

Frame extrapolation is a method to increase the frame rate of VR, AR, XR, and/or gaming applications. For instance, frame extrapolation can estimate the motion between two previously rendered frames and extrapolate a new frame based on the detected motion. In some aspects, when extrapolating frames, instead of rendering at a particular frame rate, aspects of the present disclosure can render at a lower frame rate, perform motion estimation on the rendered frames, and then use the motion estimation to extrapolate content. This content can then be interspersed with other content to produce a higher frame rate.

Some aspects of mobile AR, VR, XR, or gaming applications may have demanding constraints for both power and performance efficiency. Accordingly, these applications may have constraints to both increase performance and decrease power utilized. To alleviate these constraints, motion estimation can be performed on previously rendered content used to extrapolate frames. In turn, this can allow frame rendering to process at a reduced framerate. For example, to help decrease the performance and power, every other frame can be rendered, rather than rendering every frame. Motion estimation can then be performed between the frames. In some aspects, motion estimation can be performed between the rendered frames, and this can produce information regarding how objects or groups of pixels of an image have moved. Using the motion estimation and a previously rendered frame, a frame can be extrapolated instead of being rendered.

Although running at a reduced framerate can produce power and performance gains, the cost of performing high quality motion estimation can also be a significant overhead, e.g., when deploying frame extrapolation solutions. So motion estimation also can utilize resources and/or require a high cost. In turn, when performing frame extrapolation, the costs of motion estimation can reduce the power and performance gains of the reduced framerate. Accordingly, although the framerate may be improved there may also be an increase in the amount of resources to perform the motion estimation.

Some aspects of performing motion estimation may not require a uniform quality of motion estimation throughout an image. There can be several contributing factors motivating the need for non-uniform quality of motion estimation. For instance, lenses on AR or VR devices can have a reduced optical clarity around the edges. So in the center of the lens a picture can be clear, but the image may be blurry near the periphery of the lenses.

Further, barrel distortion can cause over-rendering in the periphery of an image, such that images near the periphery of the display may end up over represented. For example, a standard projection of a map may have the pole region represented overly large. Additionally, the human eye perceives a high resolution in a very narrow region near the center of the eye, which is a small fovea region. So near the fovea may include the most acuity and outside the fovea may be more course.

In some aspects, the motion estimation workload can be scaled along with the aforementioned parameters, where the highest quality motion estimation may occur near the center of the image, intermediate quality motion estimation can occur in the middle of the image, and in some aspects, no motion estimation may be performed near the periphery of the image. So aspects of the present disclosure can use the aforementioned parameters when performing motion estimation, such as by adjusting the motion estimation to focus computing resources on the regions near the focal point, and/or decrease the computation for the regions outside the focal point.

In some instances, when eye tracking is present, the motion estimation quality can also be scaled based on distance from the focal point, e.g., as the lower quality or lack of motion estimation may not be perceivable near the periphery regions. So aspects of the present disclosure can introduce varying levels of computation applied across different regions of an image based on a focal point of an eye.

Some aspects of the present disclosure can include a number of parameters which may be included in adjusting the motion estimation quality. For instance, aspects of the present disclosure can determine whether to perform motion estimation for a certain region or not perform motion estimation. So aspects of the present disclosure may not perform motion estimation in the peripheral regions and perform motion estimation in the center region. In regions where motion estimation is not performed, a motion vector for a group of pixels in the region may be set to a constant such as zero. In some implementations, the constant for the region may be based on an average motion vector of a region where motion estimation is performed.

Additionally, the density of motion vectors produced may be a factor when adjusting the motion estimation quality. For example, one vector may correspond to a certain amount of pixels, e.g., an 8 by 8 block of pixels, or one vector may correspond to a single pixel. In some aspects, the motion vectors that are produced to describe the motion of the pixels in the image may depend on how the motion estimation is performed. As such, there may be different levels of granularity in the motion estimation. So the granularity of the motion estimation can be varied across different regions of an image. For example, a higher priority region may use a smaller group of pixels (e.g., a 4 by 4 block of pixels) whereas a lower priority region may use a larger group of pixels (e.g., a 16 by 16 block of pixels).

In some aspects, a search window can be utilized during motion estimation. For instance, there may be a particular size of search window around each point from which motion estimation is performed. So if a point is in one portion of an image, e.g., the upper left corner of an image, a search window may be utilized around that point, such that the candidate positions for motion estimation are within that particular region of the image. For example, aspects of the present disclosure may have varying sizes of search windows at the periphery of an image or the center of the image. For instance, the center of the image may have a larger search window compared to the periphery of the image. So the search window size for each potential vector can be adjusted across different regions of the image.

In some instances, the search window can control the largest magnitude of motion vector that can be produced. For instance, algorithms may perform block matching, such that a block from a first image is compared to a corresponding block in a subsequent image. Through various computations, the blocks can be matched, which can provide information regarding how a region has moved from frame to frame or image to image. The search window can determine how far away from the location in the first image to search for a matching block in the subsequent image. Accordingly, in some instances, in order to reduce workload, a smaller search window may be utilized for lower priority regions, as larger search windows may be more resource intensive.

In some aspects, inclusion or omission of multi-pass algorithms with motion vector refinement can be utilized during motion estimation. Some motion estimation approaches may have multiple passes or multiple stages in an algorithm. There may be a hierarchical structure where motion estimation is started at a low resolution, and then performed at higher resolutions during subsequent steps. Accordingly, the motion estimation can be refined and the resolution can be increased. So there can be multiple stages where a course search is performed, and then there are refinement stages and/or vector filtering. In some implementations, the coarse search may be performed for lower priority regions and the refinement stages and/or vector filtering may be performed for only the higher priority regions.

In some instances, more complicated algorithms with multiple passes may be more thorough and more expensive compared to a simple algorithm that may not be as accurate. Aspects of the present disclosure can also change the algorithm for motion estimation depending on the region, e.g., more thorough algorithms near the focal point, and a simpler algorithm near the periphery.

Additionally, a block size of motion estimation can utilize a sum of absolute differences (SAD) or sum of squared differences (SSD) operation as a block matching operation. Algorithms utilized for the motion estimation can perform a block matching operation. The SAD and/or SSD operation can determine how well these blocks match each other. Aspects of the present disclosure can also vary the size of the blocks used based on the region of the image. Accordingly, larger blocks can be utilized for the center areas with higher priority and smaller blocks can be utilized for peripheral areas with lower priority.

Moreover, filtering can be performed during the motion search and/or performed on a certain pass of motion vectors, e.g., the final motion vectors. In some aspects, during a filtering pass, there may be some kind of smoothing or post processing of the vector data. For example, there may be noise in the motion estimation, which may need to be filtered. Filtering may also consume processing resources. As such, aspects of the present disclosure can perform more thorough filtering at regions of greater importance, e.g., higher priority regions near the center of an image, and less thorough filtering at regions of lesser importance, e.g., lower priority regions near the peripheral regions of an image.

Aspects of the present disclosure may include a number of different implementation to perform the aforementioned processes. For instance, a quality evaluation can be performed with a viewer and frame extrapolation unity test application. In some aspects, a multiple level parameter selection may be performed, such as a full quality motion estimation or no motion estimation. In some instances, a full motion estimation can be performed, e.g., in a circular region with a radius at 75% of the distance from the lens center to eye buffer edge. In these instances, the quality may not be visibly impacted, such that animation may remain smooth in the center lens area where the clarity is high. Additionally, these aforementioned motion estimation approaches may result in a reduction in motion estimation workload, e.g., a 56% reduction in motion estimation workload. Also, adding eye tracking may provide a further workload reduction, as the high quality region can follow a user's fovea region, which can allow for more aggressive motion estimation parameters.

Figure 3:
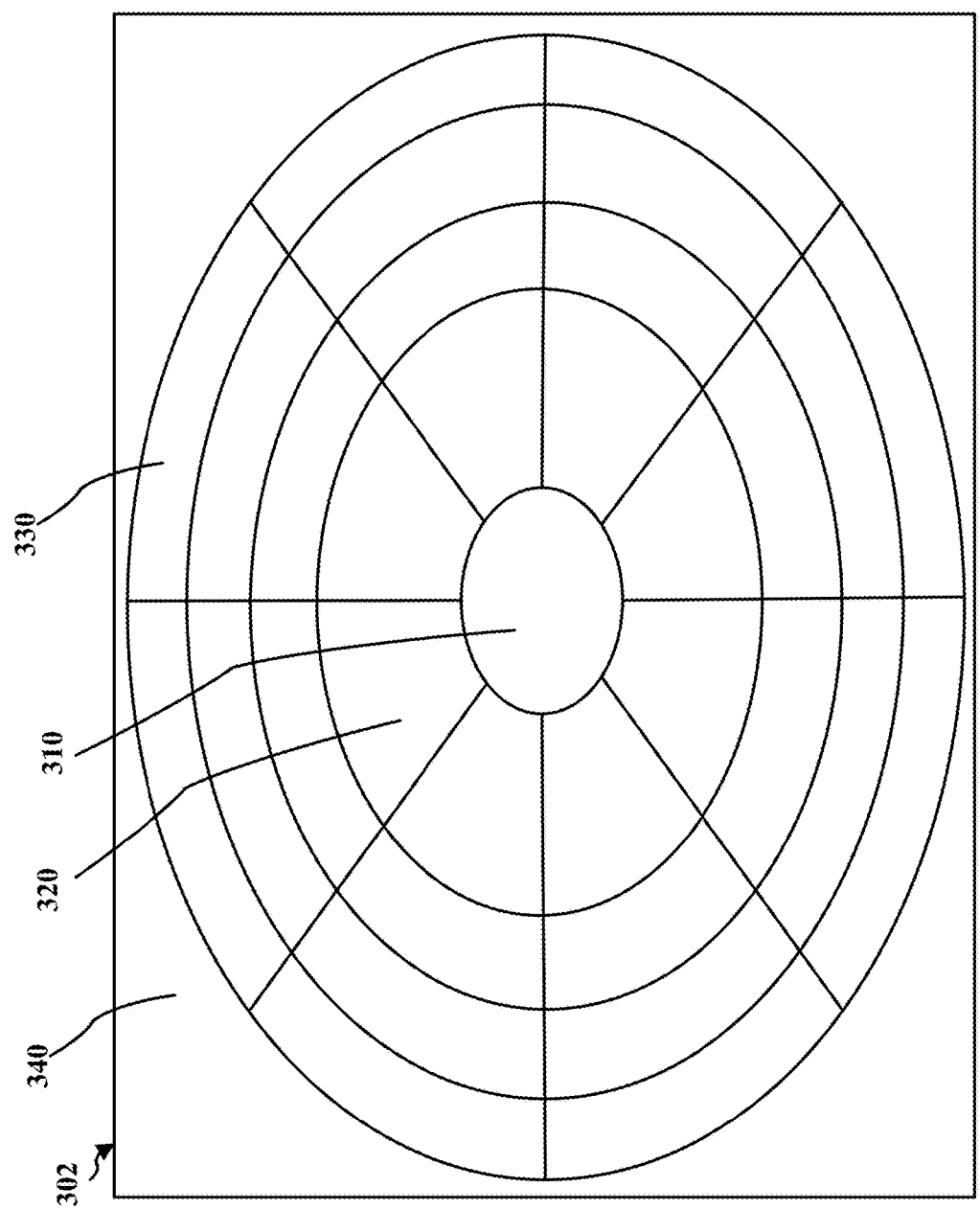
FIG. 3 illustrates example regions of a frame in accordance with one or more techniques of this disclosure.

FIG. 3 is a diagram 300 illustrating regions of a frame 302. The regions may be defined based on a center of the frame. Where eye tracking is used, the regions may be defined based on a focal point of an eye. For example, the regions may be defined as generally circular or annular concentric regions. A central region 310 may be located at the center of the frame or the focal point of an eye. The central region 310 may be assigned a highest motion estimation priority. A peripheral region 340 may be located near a periphery of the frame. For example, points within the peripheral region 340 may be located a distance from the center of the frame or the focal point that is greater than a threshold distance. In some implementations, the threshold distance may be 75% of a distance from the center of the frame to an eye buffer edge. The peripheral region 340 may be assigned a lowest motion estimation priority. In some implementations, the regions may include one or more intermediate regions located between the central region 310 and the peripheral region 340. For example, as illustrated, a first intermediate region 320 may surround the central region 310 and a second intermediate region 330 may surround the first intermediate region 320. In some implementations, each intermediate region may be defined by a threshold distance from the center of the frame or the focal point of the eye. The intermediate regions may have descending motion estimation priority for regions further from the center of the frame or the focal point of the eye. For instance, as illustrated with four regions, the order of motion estimation priority may be: central region 310, first intermediate region 320, second intermediate region 330, peripheral region 340. A motion vector quality or motion estimation quality may be assigned to each region based on the order of motion estimation priority.

Figure 4A:
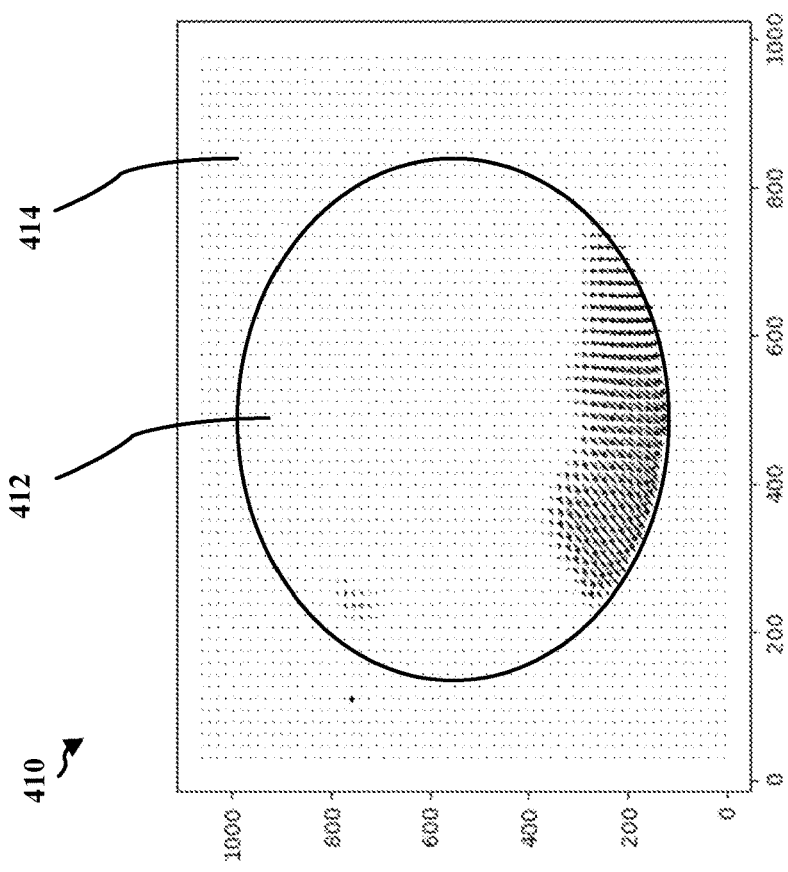
FIGS. 4A and 4B illustrate motion vectors in example frames in accordance with one or more techniques of this disclosure.
Figure 4B:
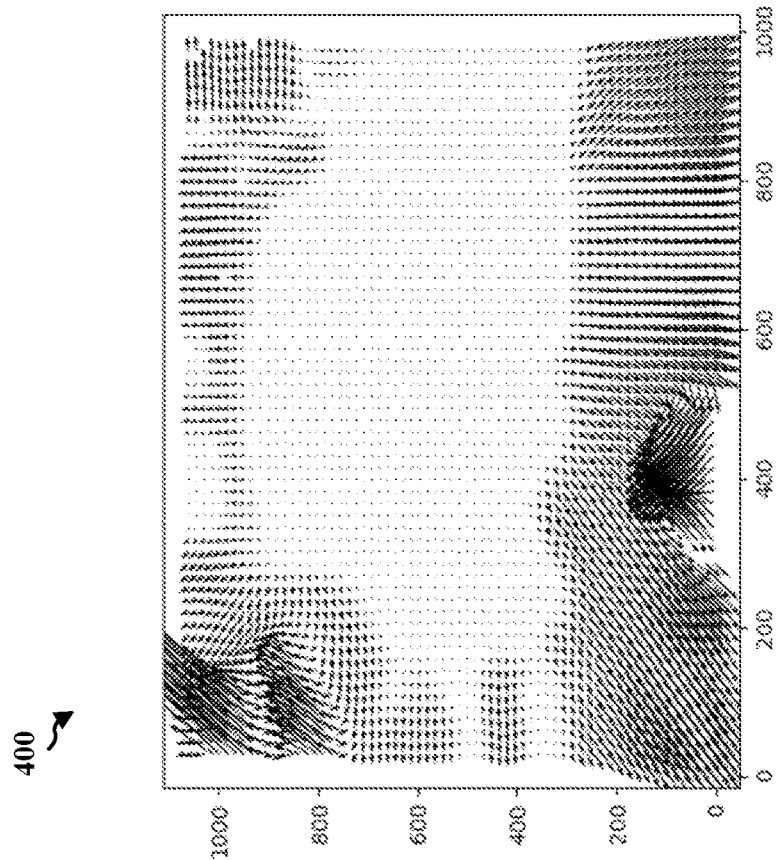

FIGS. 4A and 4B illustrate motion vectors in example frames 400 and 410, respectively, in accordance with one or more techniques of this disclosure. FIG. 4A illustrates motion vectors in frame 400 that do not utilize the aforementioned motion estimation processes of the present disclosure. FIG. 4B illustrates motion vectors in frame 410 that utilize the aforementioned motion estimation processes of the present disclosure. As illustrated in FIG. 4A, motion vectors are estimated for groups of pixels across the frame 400. As illustrated in FIG. 4B, the motion vectors are only estimated for groups of pixels within a central region 412. The motion vectors for groups of pixels within a peripheral region 414 may be set to a constant value (e.g., 0 for no motion). Accordingly, the estimated motion vectors are more focused near areas of greater importance, e.g., near the center of the frame 410. That is, the motion vectors may be estimated for each group of pixels within the central region 412 near the center of the frame 410. Accordingly, motion of the groups of pixels in the central region 412 may be more accurate when performing frame extrapolation. To a user, movement of objects represented in the frame 410 may appear as smooth as movement of objects in the frame 400. Estimation of the motion vectors for the frame 410, however, may consume significantly fewer resources than estimation of the motion vectors for the frame 400. For instance, in an implementation where the region 412 is defined as 75% of a distance from a lens center to an eye buffer edge and no motion estimation is performed for the peripheral region 414, a total motion estimation workload may be reduced by 56% in comparison to the frame 400. Accordingly, aspects of the present disclosure provide for estimation of motion vectors and the associated use of computing resources to be more focused near areas of greater importance, e.g., near the center of an image. Further, aspects of the present disclosure may reduce the amount of motion estimation performed at areas of lesser importance, e.g., areas near the periphery of an image, thereby reducing motion estimation workload and improving framerate and/or reducing power consumption.

FIGS. 5A, 5B, and 5C illustrate results of an example implementation using different motion estimation techniques for different regions. For example, FIG. 5A is a photograph of an example of an image 500 generated based on the motion vectors of FIG. 4A and FIG. 5B is a photograph of an image 510 generated based on the motion vectors of FIG. 4B. FIG. 5C is a heat map 520 showing areas of difference between FIG. 5A and FIG. 5B. The differences between FIGS. 5A and 5B would be difficult to spot by a user, especially when viewed as one of a series of frames. As illustrated in FIG. 5C, the differences are only in the peripheral region, where a user is unlikely to be focused. Accordingly, the disclosed techniques of using reduced motion estimation for peripheral regions may provide significant reductions in use of processing resources while not significantly diminishing perceived quality.

Figure 6:
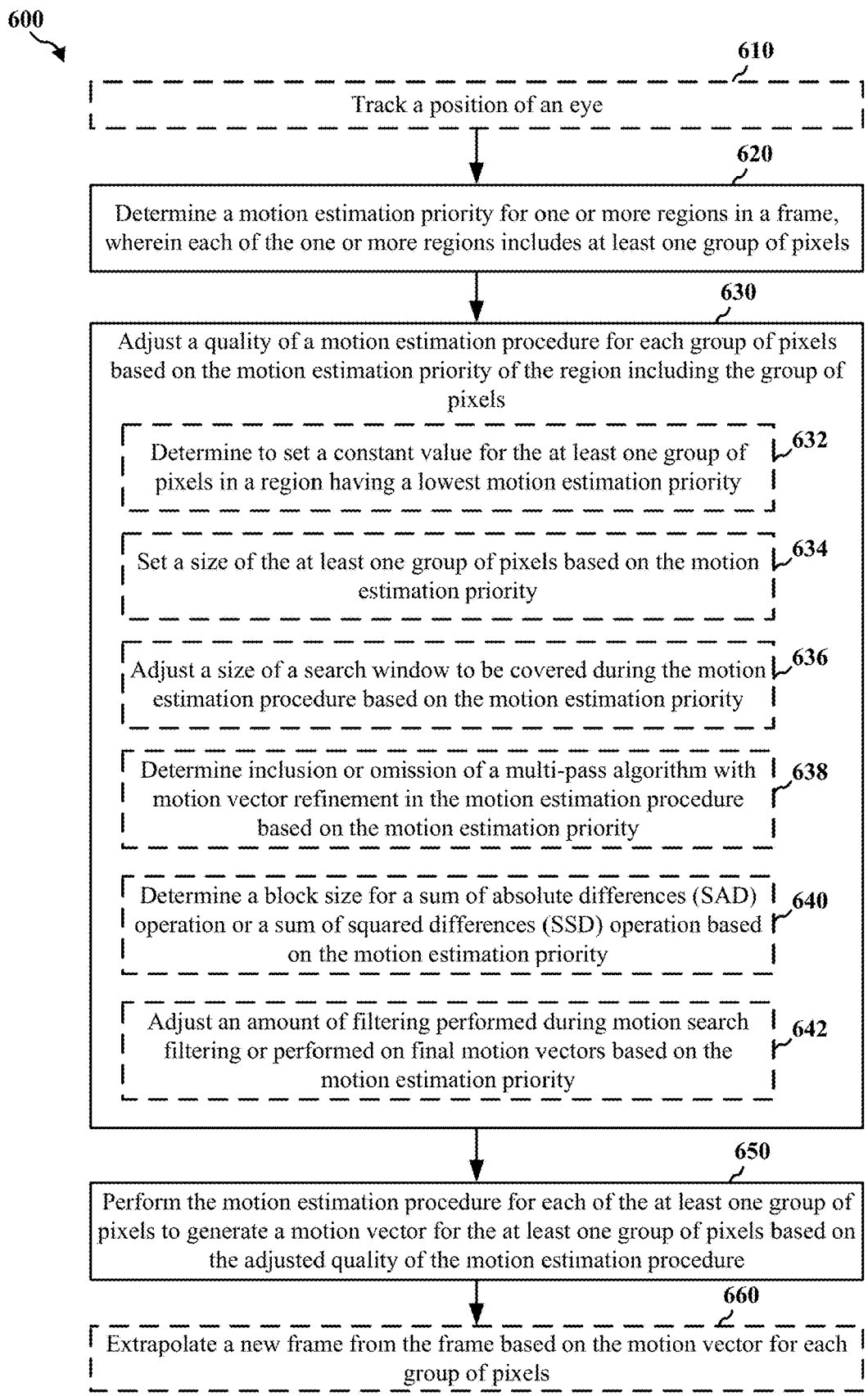
FIG. 6 illustrates an example flowchart of an example method in accordance with one or more techniques of this disclosure.

FIG. 6 illustrates an example flowchart of an example method 600 in accordance with one or more techniques of this disclosure. The method 600 may be performed by a GPU or apparatus for graphics processing. Optional blocks are shown with dashed lines.

At block 610, the method 600 may optionally include tracking a position of an eye. For example, the apparatus may include an eye tracker having one or more sensors directed at an eye of the user to determine the position of the eye. The eye tracker may determine a focal point of the eye on a display. The eye tracker may determine a corresponding point within a frame. The processing unit 120 and/or the determination component 198 may receive an indication of a position of the eye with respect to the frame.

In block 620, the method 600 may include determining a motion estimation priority for one or more regions in a frame, wherein each of the one or more regions includes at least one group of pixels. For example, the apparatus including the processing unit 120 and/or the determination component 198 can determine a motion estimation priority for one or more regions in a frame, as described in connection with the examples in FIGS. 4A and 4B. In some aspects, each of the one or more regions can include a group of pixels. For example, the one or more regions may include a central region and a peripheral region. In some implementations, the one or more regions include at least one intermediate region between the central region and the peripheral region. In some implementations, the one or more regions in the frame are defined with respect to the position of the eye.

At 630, the method 600 may include adjusting a quality of a motion estimation procedure for each group of pixels based on the motion estimation priority of the region including the group of pixels. For example, the apparatus including the processing unit 120 and/or the determination component 198 can adjust the quality of the motion estimation procedure for each group of pixels based on the motion estimation priority, as described in connection with the examples in FIGS. 4A and 4B.

For instance, in some implementations, at sub-block 632, the block 630 may optionally include determining to set a constant value for the at least one group of pixels in a region having a lowest motion estimation priority. In some implementations, at sub-block 634, the block 630 may optionally include setting a size of the at least one group of pixels based on the motion estimation priority. In some implementations, at sub-block 636, the block 630 may optionally include adjusting a size of a search window to be covered during the motion estimation procedure based on the motion estimation priority. In some implementations, at sub-block 638, the block 630 may optionally include determining inclusion or omission of a multi-pass algorithm with motion vector refinement in the motion estimation procedure based on the motion estimation priority. In some implementations, at sub-block 640, the block 630 may optionally include determining a block size for a SAD operation or a SSD operation based on the motion estimation priority. In some implementations, at sub-block 642, the block 630 may optionally include adjusting an amount of filtering performed during motion search filtering or performed on final motion vectors based on the motion estimation priority. In an aspect, the block 630 may include two or more of sub-blocks 632, 634, 636, 638, 640, or 642 in combination.

At block 650, the method 600 may include performing the motion estimation procedure for each of the at least one group of pixels to generate a motion vector for the at least one group of pixels based on the adjusted quality of the motion estimation procedure. For example, the apparatus including the processing unit 120 and/or the determination component 198 can also perform the motion estimation procedure for each of the one or more regions based on the adjusted quality of the of the motion estimation procedure, as described in connection with the examples in FIGS. 4A and 4B.

At block 660, the method 600 may optionally include extrapolating a new frame from the frame based on the motion vector for each group of pixels. For example, the processing unit 120 and/or the determination component 198 may extrapolate a new frame (e.g., image 510) from the frame based on the motion vector for each group of pixels.

In one configuration, a method or apparatus for graphics processing is provided. The apparatus may be a GPU or some other processor that can perform graphics processing. In one aspect, the apparatus may be the processing unit 120 within the device 104, or may be some other hardware within device 104 or another device. The apparatus may include means for tracking a position of an eye. The apparatus may include means for determining a motion estimation priority for one or more regions in a frame. The apparatus can also include means for adjusting a quality a motion estimation procedure for each group of pixels based on the motion estimation priority of the region including the group of pixels. The apparatus can also include means for performing the motion estimation procedure for each of the at least one group of pixels to generate a motion vector for the at least one group of pixels based on the adjusted quality of the motion estimation procedure. The apparatus can also include means for extrapolating a new frame from the frame based on the motion vector for each group of pixels.

The subject matter described herein can be implemented to realize one or more benefits or advantages. For instance, the described graphics processing techniques can be accomplished at a low cost compared to other graphics processing techniques. Moreover, the graphics processing techniques herein can improve or speed up the data processing or execution of GPUs. Further, the graphics processing techniques herein can improve a GPU's resource or data utilization and/or resource efficiency. Additionally, aspects of the present disclosure can improve the motion estimation of a GPU, which can in turn improve the accuracy and efficiency of the GPU. Aspects of the present disclosure can also improve the accuracy of motion estimation.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method for graphics processing, comprising:
    determining a motion estimation priority for one or more regions in a frame, wherein each of the one or more regions includes at least one group of pixels;
    adjusting a quality of a motion estimation procedure for each group of pixels based on the motion estimation priority of the region including the group of pixels, wherein adjusting the quality of the motion estimation procedure comprises determining to set a constant value for the at least one group of pixels in a region having a lowest motion estimation priority; and
    performing the motion estimation procedure for each of the at least one group of pixels to generate a motion vector for the at least one group of pixels based on the adjusted quality of the motion estimation procedure.

2. The method of claim 1, wherein the one or more regions include a central region and a peripheral region.

3. The method of claim 2, wherein the one or more regions include at least one intermediate region between the central region and the peripheral region.

4. The method of claim 1, further comprising:
    tracking a position of an eye, wherein the one or more regions in the frame are defined with respect to the position of the eye.

5. The method of claim 1, wherein adjusting the quality of the motion estimation procedure for each group of pixels based on the motion estimation priority of the region including the group of pixels comprises setting a size of the at least one group of pixels based on the motion estimation priority of the region.

6. The method of claim 1, wherein adjusting the quality of the motion estimation procedure for each group of pixels based on the motion estimation priority of the region including the group of pixels comprises adjusting a size of a search window to be covered during the motion estimation procedure based on the motion estimation priority of the region.

7. The method of claim 1, wherein adjusting the quality of the motion estimation procedure for each group of pixels based on the motion estimation priority of the region including the group of pixels comprises determining inclusion or omission of a multi-pass algorithm with motion vector refinement in the motion estimation procedure based on the motion estimation priority of the region.

8. The method of claim 1, wherein adjusting the quality of the motion estimation procedure for each group of pixels based on the motion estimation priority of the region including the group of pixels comprises determining a block size for a sum of absolute differences (SAD) operation or a sum of squared differences (SSD) operation based on the motion estimation priority of the region.

9. The method of claim 1, wherein adjusting the quality of the motion estimation procedure for each group of pixels based on the motion estimation priority of the region including the group of pixels comprises adjusting an amount of filtering performed during motion search filtering or performed on final motion vectors based on the motion estimation priority of the region.

10. The method of claim 1, further comprising extrapolating a new frame from the frame based on the motion vector for each group of pixels.

11. An apparatus for graphics processing, comprising:
    a memory; and
    at least one processor coupled to the memory and configured to:
    determine a motion estimation priority for one or more regions in a frame, wherein each of the one or more regions includes at least one group of pixels;
    adjust a quality of a motion estimation procedure for each group of pixels based on the motion estimation priority of the region including the group of pixels,
    wherein the at least one processor is configured to determine to set a constant value for the at least one group of pixels in a region having a lowest motion estimation priority; and
    perform the motion estimation procedure for each of the at least one group of pixels to generate a motion vector for the at least one group of pixels based on the adjusted quality of the motion estimation procedure.

12. The apparatus of claim 11, wherein the one or more regions include a central region and a peripheral region.

13. The apparatus of claim 12, wherein the one or more regions include at least one intermediate region between the central region and the peripheral region.

14. The apparatus of claim 11, wherein the at least one processor is configured to track a position of an eye, wherein the one or more regions in the frame are defined with respect to the position of the eye.

15. The apparatus of claim 11, wherein the at least one processor is configured to set a size of the at least one group of pixels based on the motion estimation priority of the region.

16. The apparatus of claim 11, wherein the at least one processor is configured to adjust a size of a search window to be covered during the motion estimation procedure based on the motion estimation priority of the region.

17. The apparatus of claim 11, wherein the at least one processor is configured to determine inclusion or omission of a multi-pass algorithm with motion vector refinement in the motion estimation procedure based on the motion estimation priority of the region.

18. The apparatus of claim 11, wherein the at least one processor is configured to determine a block size for a sum of absolute differences (SAD) operation or a sum of squared differences (SSD) operation based on the motion estimation priority of the region.

19. The apparatus of claim 11, wherein the at least one processor is configured to adjust an amount of filtering performed during motion search filtering or performed on final motion vectors based on the motion estimation priority of the region.

20. The apparatus of claim 11, wherein the at least one processor is configured to extrapolate a new frame from the frame based on the motion vector for each group of pixels.

21. An apparatus for graphics processing, comprising:
  means for determining a motion estimation priority for one or more regions in a frame, wherein each of the one or more regions includes at least one group of pixels;
  means for adjusting a quality of a motion estimation procedure for each group of pixels based on the motion estimation priority of the region including the group of pixels,
  wherein the means for adjusting the quality of the motion estimation procedure is configured to determine to set a constant value for the at least one group of pixels in a region having a lowest motion estimation priority; and
  means for performing the motion estimation procedure for each of the at least one group of pixels to generate a motion vector for the at least one group of pixels based on the adjusted quality of the motion estimation procedure.

22. The apparatus of claim 21, further comprising means for tracking a position of an eye, wherein the one or more regions in the frame are defined with respect to the position of the eye.

23. The apparatus of claim 21, wherein the one or more regions include a central region and a peripheral region.

24. The apparatus of claim 21, wherein the means for adjusting the quality of the motion estimation procedure for each group of pixels based on the motion estimation priority of the region including the group of pixels is configured to set a size of the at least one group of pixels based on the motion estimation priority of the region.

25. The apparatus of claim 21, wherein the means for adjusting the quality of the motion estimation procedure for each group of pixels based on the motion estimation priority of the region including the group of pixels is configured to adjust a size of a search window to be covered during the motion estimation procedure based on the motion estimation priority of the region.

26. The apparatus of claim 21, further comprising means for extrapolating a new frame from the frame based on the motion vector for each group of pixels.

27. A non-transitory computer-readable medium storing computer executable code for graphics processing, comprising code to:
  determine a motion estimation priority for one or more regions in a frame based on a distance of each of the one or more regions from a focal point of the frame, wherein each of the one or more regions includes at least one group of pixels;
  adjust a quality of a motion estimation procedure for each group of pixels based on the motion estimation priority of the region including the group of pixels, wherein the code to adjust the quality of the motion estimation procedure includes code to set a constant value for the at least one group of pixels in a region having a lowest motion estimation priority; and
  perform the motion estimation procedure for each of the at least one group of pixels to generate a motion vector for the at least one group of pixels based on the adjusted quality of the motion estimation procedure.

* * * * *